United States Patent
Park et al.

(10) Patent No.: US 11,228,901 B2
(45) Date of Patent: Jan. 18, 2022

(54) METHOD FOR INSTALLING SUBSCRIBER PROFILE AND ELECTRONIC DEVICE THEREFOR

(71) Applicant: Samsung Electronics Co., Ltd., Suwon-si (KR)

(72) Inventors: Daesoo Park, Suwon-si (KR); Jinwoo Lee, Suwon-si (KR); Yongbeom Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/833,115

(22) Filed: Mar. 27, 2020

(65) Prior Publication Data

US 2020/0314635 A1 Oct. 1, 2020

(30) Foreign Application Priority Data

Mar. 28, 2019 (KR) ........................ 10-2019-0036087

(51) Int. Cl.
*H04M 3/00* (2006.01)
*H04W 8/24* (2009.01)
*H04W 12/08* (2021.01)
*H04W 48/16* (2009.01)
*H04W 12/40* (2021.01)

(52) U.S. Cl.
CPC ........... *H04W 8/245* (2013.01); *H04W 12/08* (2013.01); *H04W 12/40* (2021.01); *H04W 48/16* (2013.01)

(58) Field of Classification Search
CPC . H04M 2203/6009; H04M 2203/6018; H04M 2203/6045; H04M 3/42068; H04M 3/4211

USPC ........... 455/415, 41.2, 3.05, 414.1, 445, 99, 455/426.1, 517
See application file for complete search history.

(56) References Cited

U.S. PATENT DOCUMENTS

| | | | |
|---|---|---|---|
| 7,200,385 B1 | 4/2007 | Wallenius et al. | |
| 10,057,761 B1* | 8/2018 | Shah | H04L 67/303 |
| 10,440,558 B1* | 10/2019 | De Figueiredo Junior | H04W 12/0027 |
| 2003/0135096 A1* | 7/2003 | Dodds | G06Q 50/24 600/300 |
| 2012/0021805 A1* | 1/2012 | Hauck | H04W 12/08 455/558 |

(Continued)

FOREIGN PATENT DOCUMENTS

| | | |
|---|---|---|
| EP | 3337205 A1 | 6/2018 |
| KR | 10-2018-0028729 A | 3/2018 |

(Continued)

OTHER PUBLICATIONS

European Search Report dated Aug. 12, 2020 in connection with European Patent Application No. 20 16 6220, 10 pages.

(Continued)

*Primary Examiner* — Joseph Arevalo

(57) ABSTRACT

Various embodiments relate to a method and an electronic device for installing a subscriber profile. The method includes obtaining network operator-related information. The method also includes identifying whether download of an embedded subscriber identity module (eSIM) profile is allowed based on the network operator-related information. The method further includes downloading the eSIM profile when download of the eSIM profile is allowed.

18 Claims, 10 Drawing Sheets

(56) References Cited

U.S. PATENT DOCUMENTS

| | | | |
|---|---|---|---|
| 2014/0045460 A1 | 2/2014 | Park et al. | |
| 2016/0034935 A1* | 2/2016 | Neb | G06Q 30/0273 |
| | | | 705/14.16 |
| 2016/0057624 A1 | 2/2016 | Yang et al. | |
| 2016/0156607 A1* | 6/2016 | Kim | H04W 12/06 |
| | | | 726/7 |
| 2016/0157085 A1* | 6/2016 | Yeoum | H04M 3/387 |
| | | | 455/435.1 |
| 2016/0241537 A1* | 8/2016 | Cha | G06F 21/31 |
| 2017/0156051 A1* | 6/2017 | Park | H04W 4/80 |
| 2018/0062853 A1 | 3/2018 | Li et al. | |
| 2018/0352530 A1 | 12/2018 | Singh et al. | |
| 2019/0053043 A1* | 2/2019 | Cha | H04M 1/0266 |
| 2019/0208405 A1 | 7/2019 | Park et al. | |
| 2019/0327605 A1* | 10/2019 | Fan | H04W 8/205 |
| 2019/0342252 A1* | 11/2019 | Dascola | H04L 51/24 |
| 2019/0357038 A1* | 11/2019 | Schouler | H04W 8/20 |
| 2020/0021973 A1* | 1/2020 | Anslot | H04W 4/50 |
| 2020/0120494 A1* | 4/2020 | Fares | H04W 8/18 |
| 2020/0169870 A1* | 5/2020 | Lucas | H04W 8/205 |
| 2021/0058774 A1 | 2/2021 | Yang et al. | |

FOREIGN PATENT DOCUMENTS

| | | |
|---|---|---|
| KR | 20200044629 A | 4/2020 |
| WO | 2018/036624 A1 | 3/2018 |
| WO | 2019/015793 A1 | 1/2019 |
| WO | 2019/018244 A1 | 1/2019 |
| WO | 2019/042541 A1 | 3/2019 |

OTHER PUBLICATIONS

International Search Report dated Jul. 10, 2020 in connection with International Patent Application No. PCT/KR2020/004096, 3 pages.
Written Opinion of the International Searching Authority dated Jul. 10, 2020 in connection with International Patent Application No. PCT/KR2020/004096, 5 pages.

* cited by examiner

METHOD FOR INSTALLING SUBSCRIBER PROFILE AND ELECTRONIC DEVICE THEREFOR

CROSS-REFERENCE TO RELATED APPLICATION

This application is based on and claims priority under 35 U.S.C. 119 to Korean Patent Application No. 10-2019-0036087 filed on Mar. 28, 2019 in the Korean Intellectual Property Office, the disclosure of which is herein incorporated by reference in its entirety.

BACKGROUND

1. Field

Various embodiments relate to a method for installing a subscriber profile and an electronic device therefor.

2. Description of Related Art

A universal integrated circuit card (UICC) is a smart card which is inserted into a mobile communication terminal for use. A UICC may store personal information about a mobile communication subscriber and enables the use of secure mobile communication via subscriber authentication and traffic security key in accessing to a mobile communication network.

A UICC is manufactured as a dedicated card for a particular mobile communication operator by request of the operator at the time of manufacture of the card and may be released with authentication information of the operator for network access, for example, a universal subscriber identity module (USIM) application and an international mobile subscriber identity (IMSI), loaded in advance. The mobile communication operator receives the manufactured UICC card and provides the UICC card for a subscriber. If necessary, it is possible to manage, for example, install, modify, or delete, an application in the UICC card using an over-the-air (OTA) technology or the like. The subscriber may insert the UICC card into a mobile communication terminal to use a network and an application service of the mobile communication operator. When the existing terminal is replaced with a new terminal, the subscriber can insert the UICC card into the new terminal, thereby using the same authentication information, mobile phone number, and personal contacts as stored in the UICC card in the new terminal.

A UICC can be replaced by embedding a security module performing a function similar to that of a UICC in a mobile communication terminal at the time of manufacture of the terminal. Therefore, an embedded universal integrated circuit card (eUICC) structure, which is an undetachable UICC, has been proposed.

The above information is presented as background information only to assist with an understanding of the disclosure. No determination has been made, and no assertion is made, as to whether any of the above might be applicable as prior art with regard to the disclosure.

SUMMARY

Network lock may be restricting the use of an electronic device to block network-related functions when an invalid subscriber identity module (SIM) card is inserted into the electronic device with a valid SIM card inserted. For example, when restrictions are imposed so that an electronic device released in a country can recognize only a SIM card of a network operator of the country or can recognize only a SIM card of a specified network operator in the country, network lock may occur to the electronic device. When the invalid SIM card is a plastic SIM card, network lock may be released by physically removing the invalid plastic card from the electronic device having the network lock. When the invalid SIM card is an embedded subscriber identity module (eSIM) card, it is impossible to remove the invalid eSIM card from the electronic device having network lock, and thus network-related functions may be blocked.

Various embodiments provide a method for installing a subscriber profile and an electronic device thereof.

According to various embodiments, an operating method of an electronic device may include: obtaining network operator-related information; identifying whether download of an embedded subscriber identity module (eSIM) profile is allowed based on the network operator-related information; and downloading the eSIM profile when download of the eSIM profile is allowed.

According to various embodiments, an electronic device may include: a display; a communication unit; and a processor configured to be operatively connected to the display and the communication unit. The processor may perform control to: obtain network operator-related information; identify whether download of an embedded subscriber identity module (eSIM) profile is allowed based on the network operator-related information; and download the eSIM profile when download of the eSIM profile is allowed.

A method and an electronic device thereof according to various embodiments may identify in advance whether network lock occurs before downloading an embedded subscriber identity module (eSIM) profile, thereby preventing network lock which occurs by downloading an eSIM profile.

Further, a method and an electronic device thereof according to various embodiments may obtain information about a network operator which causes network lock, thus configuring a list of network operators which allow download of an eSIM profile.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments will be described in detail with reference to the accompanying drawings.

Figure 1:
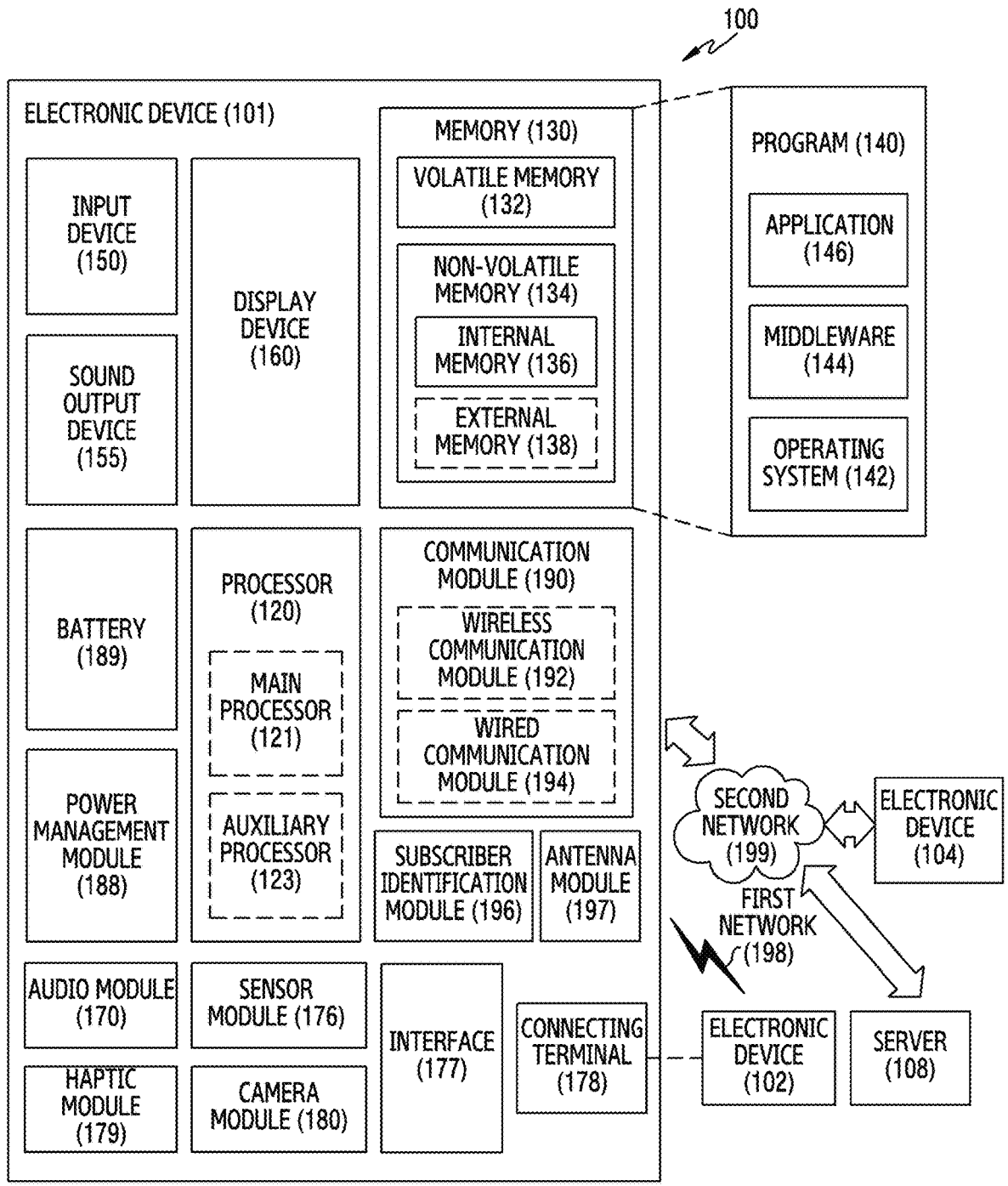
FIG. 1 illustrates a block diagram of an electronic device in a network environment according to various embodiments.

FIG. 1 illustrates a block diagram of an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
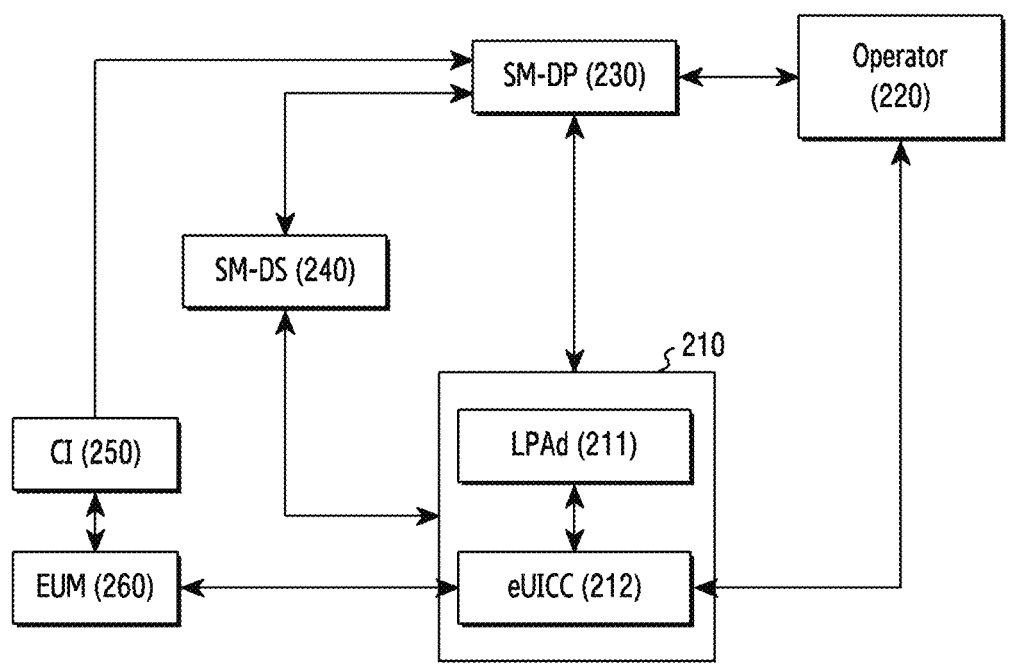
FIG. 2 illustrates a system including an electronic device that supports an embedded subscriber identity module (eSIM) function according to various embodiments.

FIG. 2 illustrates a system including an electronic device that supports an embedded subscriber identity module (eSIM) function according to various embodiments.

An eSIM may be embedded in the electronic device 210, and the electronic device 210 may access an external server to download a profile of the eSIM in a software package. To remove the eSIM, software corresponding to the eSIM may be deleted from the electronic device 210. The eSIM is a logical concept and may exist physically inside an embedded universal integrated circuit card (eUICC) 212.

Referring to FIG. 2, the electronic device 210 (e.g., the electronic device 102 of FIG. 1) may include a local profile assistant in the device (LPAd) 211 and the eUICC 212. The LPAd 211 may be a software module installed in the electronic device 210. The LPAd 211 may assist in installing the profile of the eSIM, downloaded from the external server (e.g., a subscription manager for data preparation (SM-DP) 230), in the eUICC. For example, the LPAd 211 may retrieve the external server, may download the profile of the eSIM, and may forward the profile to the eUICC. The LPAd 211 may deactivate or remove a previously installed eSIM profile. The LPAd 211 may include a local discovery service when a local profile assistant (LPA) is in the device (LDSd), which manages a connection between a subscription manager discovery server (SM-DS) 240 and the LPAd 211, a local profile download when the LPA is in the device (LPDd), which manages download of an eSIM profile, and a local user interface when the LPA is in the device (LUId), which manages a user interface (UI) of the LPAd 211. The eUICC 212 may be a physical card in which an eSIM profile is installed.

An operator 220 may be an operator that provides a wireless network service for the electronic device 210. For example, when the electronic device 210 makes a network subscription request to the operator 220 to join the network, the operator 220 may generate an eSIM profile based on personal information about the electronic device 210 and may provide the generated eSIM profile to the SM-DP. The SM-DP 230 may be a server that stores the eSIM profile of the electronic device 210. For example, the electronic device 210 supporting the eSIM function may retrieve the SM-DP to connect to an SM-DP server and may retrieve and download the eSIM profile of the electronic device 210 from the SM-DP. An SM-DS 240 may be a server that retrieves the SM-DP 230 requested by the electronic device 210. The electronic device 210 may connect directly to the SM-DP 230 without passing through the SM-DS 240. A certificate issuer (CI) 250 may issue a certificate for eSIM provisioning. An eUICC manufacturer (EUM) may be an entity that manufactures an eUICC.

A specific process for downloading the eSIM profile of the electronic device 210 is as follows. The electronic device 210 may make a subscription request through an operator 220. The operator 220 may generate an eSIM profile corresponding to the subscription request of the electronic device 210 and may transmit the generated eSIM profile to the SM-DP 230. The electronic device 210 may access the SM-DS 240 through the LPAd 211 and may receive an address of the SM-DP 230. The electronic device 210 may access the address of the SM-DP 230 received through the LPAd 211. The SM-DP 230 may perform a predefined authentication process, may segment the stored eSIM profile of the electronic device 210, and may transmit the segmented eSIM profile to the LPAd 211 of the electronic device 210. The LPAd 211 may transmit eSIM profile data of the received eSIM profile to the eUICC 212 based on a standard protocol. The transmitted eSIM profile data may be installed as one eSIM profile based on an internal mechanism of the eUICC 212. The LPAd 211 may activate the installed eSIM profile, which may be similar to inserting a plastic SIM card.

Figure 3:
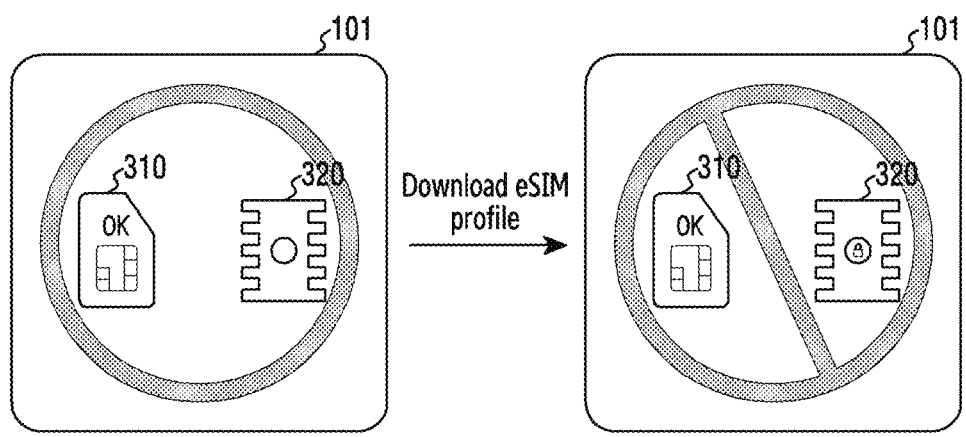
FIG. 3 illustrates a method for preventing network lock occurring in an electronic device before installing a subscriber profile according to various embodiments.

FIG. 3 illustrates a method for preventing network lock occurring in an electronic device 101 before installing a subscriber profile according to various embodiments. Referring to FIG. 3, the electronic device 101 may include a plastic SIM card 310 and an eUICC 320 with an eSIM profile not downloaded. The electronic device 101 may download an eSIM profile through a network of the plastic SIM card 310. After downloading the eSIM profile, the electronic device 101 may activate the eSIM profile in the eUICC 320 and may determine whether network lock occurs through a lock validity check process. For example, the network lock may be for putting a restriction so that the electronic device 101 may use a network only with a SIM card having a specific operator's mobile country code (MCC) and/or mobile network code (MNC). With the network lock set, when a SIM card having a different MCC and/or MNC that is not allowed is inserted, a network-related function of the electronic device 101 may be blocked. An MCC is a three-digit country identification code stored in a SIM profile, and may be used to specify a country since each country has one MCC. An MNC is a network operator identification code, and one operator may have one or more MNCs in a single country. For example, a combination of an MNC and an MCC may specify an operator. Since a mobile virtual network operator (MVNO) may rent and use a different operator's circuit network, it may be impossible to distinguish between operators through an MCC and an MNC, and thus a group identifier (GID) may be further used for reference. An integrated circuit card identifier (ICCID) is a 19-digit serial code stored in a SIM profile and may have a unique ICCID value for the SIM profile.

After the electronic device 101 activates the downloaded eSIM profile, when network lock occurs in the electronic device 101, the network-related function may be blocked, and the electronic device 101 may be in a state in which a general phone call or data communication is not supported.

According to various embodiments, to prevent network lock from occurring in the electronic device 101, the electronic device 101 may check whether network lock has occurred before downloading the eSIM profile. According to one embodiment, the electronic device 101 may request network operator-related information from an external server (e.g., the server 108 of FIG. 1 or the SM-DP 230 of FIG. 2) before downloading the eSIM profile. The electronic device 101 may extract identification information, such as an MCC, an MNC, GID1, or GID2, based on the received network operator-related information. The electronic device 101 may check whether download of the eSIM profile is allowed based on the extracted identification information, thereby preventing network lock in advance.

Figure 4:
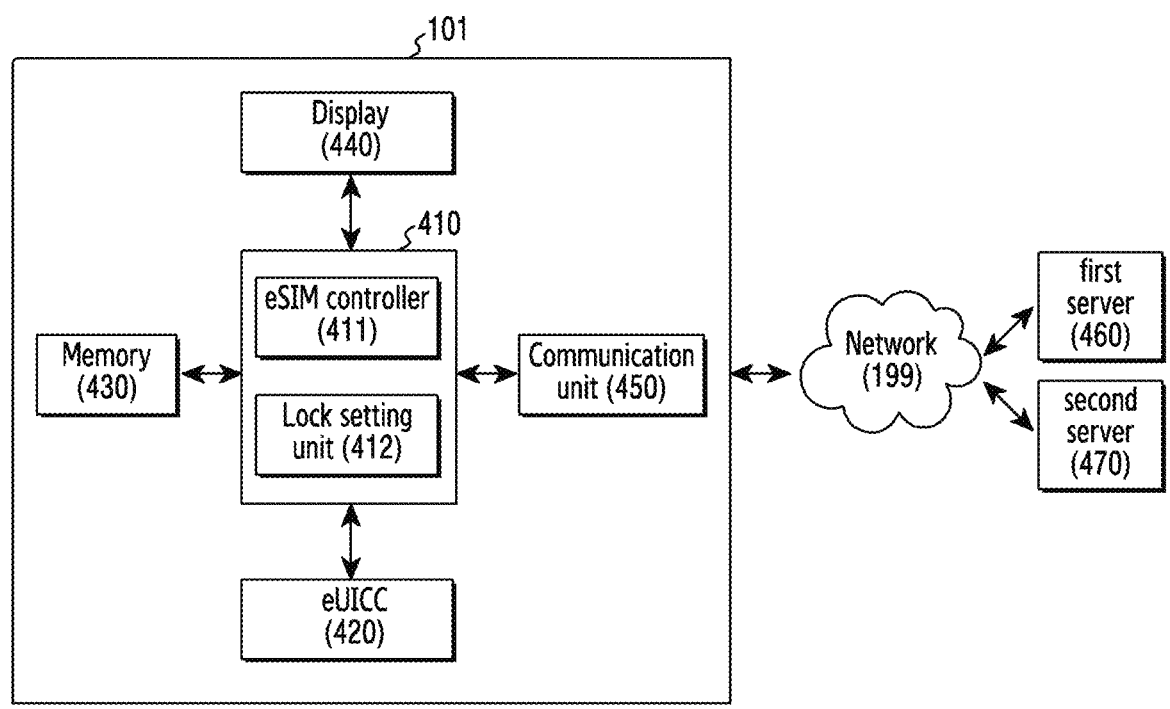
FIG. 4 illustrates a block diagram of an electronic device for installing a subscriber profile according to various embodiments.

FIG. 4 illustrates a block diagram of an electronic device 101 for installing a subscriber profile according to various embodiments. Referring to FIG. 4, the electronic device 101 may include a processor 410 (e.g., the processor 120 of FIG. 1), an eUICC 420 (e.g., the SIM 196 of FIG. 1), a memory 430 (e.g., the memory 130 of FIG. 1), a display 440 (e.g., the display device 160 of FIG. 1), and/or a communication unit 450 (e.g., the communication module 190 of FIG. 1).

The processor 410 may control the overall operation of the electronic device 101. For example, the processor 410 may control at least one other component (e.g., a hardware or software component) connected to the processor 410 and may perform various types of data processing or operations. According to one embodiment, as at least part of the data processing or operations, the processor 410 may load a command or data received from another component into the memory 430, may process a command or data stored in the memory 430, and may store the resulting data in the memory 430. According to one embodiment, the processor 410 may perform control to obtain network operator-related information from a first server 460 (e.g., the SM-DP 230 of FIG. 2) or a second server 470 (e.g., the server 108 of FIG. 1)) through a network (e.g., the second network 199 of FIG. 1) and to check whether the electronic device 101 is allowed to download an eSIM profile based on the network operator-related information. When downloading the eSIM profile is allowed, the processor 410 may perform control to download the eSIM profile. When downloading the eSIM profile is not allowed, the processor 410 may perform control to stop downloading the eSIM profile or to display a warning message on the display 440.

The processor 410 may include an eSIM controller 411 and/or a lock setting unit 412. These components of the processor 410 may be configured in hardware, in software, or in a combination of hardware and software.

The eSIM controller 411 may collect advance information about the eSIM profile to be downloaded via a connection to the first server 460 (e.g., the SM-DP 230 of FIG. 2) or the second server 470 (e.g., the server 108 of FIG. 1)) through the second network 199. The eSIM controller 411 may include an LPAd, an LDSd, an LPDd, and/or an LUId. The advance information about the eSIM profile may be network operator-related information specifying a network operator of the eSIM profile. According to one embodiment, the advance information about the eSIM profile may be stored in advance in the memory 430 of the electronic device 101. For example, the network operator-related information may be information available to identify the network operator and may include, for example, at least one of eSIM profile metadata, an MCC, an MNC, GID1, GID2, and/or an ICCID. The lock setting unit 412 may check whether network lock occurs in the electronic device 101 based on the collected advance information about the eSIM profile. For example, the lock setting unit 412 may compare the advance information about the eSIM profile with lock setting information about the electronic device 101 stored in the memory 430, thereby determining whether network lock occurs in the electronic device 101.

The eUICC 420 may be a physical card in which the eSIM profile requested by the electronic device 101 is installed. For example, the electronic device 101 may identify and authenticate the electronic device 101 within a communication network (e.g., the first network 198 or the second network 199 of FIG. 1) using subscriber information (e.g., an international mobile subscriber Identity (IMSI)) stored in the eUICC 420.

The memory 430 may store various data used by at least one component (e.g., the processor 410) of the electronic device 101. The data may include, for example, software, the lock setting information about the electronic device 101, and input data or output data about a command associated therewith.

The display 440 may visually and/or audibly provide information to the electronic device 101. For example, the display 440 may include, for example, at least one light emitting diode (LED), a speaker, or a control circuit for controlling a display and may output a sound through an audio output device or an external device (e.g., a speaker or a headphone) connected directly or wirelessly to the electronic device 101.

The communication unit 450 may support establishing a direct (e.g., wired) communication channel or a wireless communication channel between the electronic device 101 and the first server 460 or the second server 470 and performing communication through the established communication channel. According to one embodiment, the communication unit 450 may include a wireless communication module (e.g., a cellular communication module, a short-range wireless communication module, or a global navigation satellite system (GNSS) communication module) or a wired communication module (e.g., a local area network (LAN) communication module or a power-line communication module). Among these communication modules, a corresponding communication module may communicate with an external electronic device via the first network (e.g., a short-range communication network including a BLUETOOTH, Wi-Fi direct, or infrared data association (IrDA) network) or a network (e.g., a long-range communication network including a cellular network, the Internet, or a computer network (e.g., a LAN or WAN)). These various types of communication modules may be integrated into one component (e.g., a single chip) or may be configured as a plurality of separate components (e.g., a plurality of chips). According to one embodiment, the communication unit 450 may include a framework for processing data in a standard manner for communication with the first server 460 or the second server 470.

Figure 5:
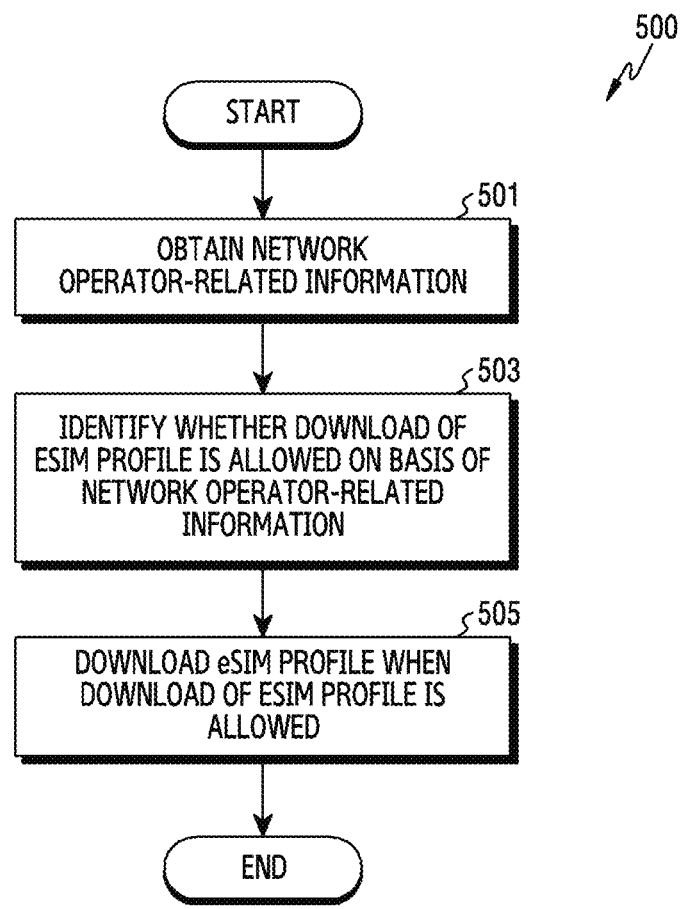
FIG. 5 illustrates a flowchart of an electronic device for installing a subscriber profile according to various embodiments.

FIG. 5 illustrates a flowchart 500 of an electronic device 101 for installing a subscriber profile according to various embodiments. The subject of operations in the flowchart 500 illustrated in FIG. 5 may be understood as the electronic device 101 or a component (e.g., the processor 410) of the electronic device 101.

Referring to FIG. 5, in operation 501, the electronic device 101 (e.g., the processor 410) may obtain network operator-related information. For example, the electronic device 101 may receive the network operator-related information from a first server 460 (e.g., the SM-DP 230 of FIG. 2) or a second server 470 (e.g., the server 108 of FIG. 1) through a network. The network operator-related information may be information available to identify a network operator and may include, for example, at least one of eSIM profile metadata, an MCC, an MNC, GID1, GID2, and/or an ICCID. According to various embodiments, the network operator-related information may be stored in advance in a memory (e.g., the memory 430 of FIG. 4) of the electronic device 101. According to various embodiments, the network operator-related information may be stored in advance as a code in the memory of the electronic device 101, and the electronic device 101 may use the network operator-related information stored in advance without going through the network. For example, the electronic device 101 may import network operator-related information corresponding to a subscribed MNO from the memory and may check whether download of an eSIM profile is allowed based on the network operator-related information.

In operation 503, the electronic device 101 may check whether download of an eSIM profile is allowed based on the network operator-related information. For example, the electronic device 101 may extract identification information based on the network operator-related information. The identification information may be information for identifying a network operator and may include, for example, at least one of an MCC, an MNC, GID1, and and/or GID2. The electronic device 101 may compare the extracted identification information with lock setting information, thereby checking whether download of the eSIM profile is allowed. The lock setting information may include information about network operators which may lock a network or information about network operators which allow download of the eSIM profile. For example, the lock setting information may include at least one of an MCC, an MNC, GID1 and/or GID2. According to one embodiment, when the lock setting information includes information about network operators which may lock a network, the electronic device 101 may specify a network operator through the identification information, and may stop downloading the eSIM profile when the specified network operator is included in the network operators which may lock a network of the lock setting information. According to one embodiment, when the lock setting information includes information about network operators which allow download of the eSIM profile, the electronic device 101 may specify a network operator through the identification information, and may stop downloading the eSIM profile when the specified network operator is not included in the network operators which allow download of the eSIM profile of the lock setting information.

When download of the eSIM profile is allowed, the electronic device 101 may download the eSIM profile in operation 505. According to one embodiment, when the lock setting information includes information about network operators which may lock a network, the electronic device 101 may specify a network operator through the identification information, and may download the eSIM profile when the specified network operator is not included in the network operators which may lock a network of the lock setting information. According to one embodiment, when the lock setting information includes information about network operators which allow download of the eSIM profile, the electronic device 101 may specify a network operator through the identification information, and may download the eSIM profile when the specified network operator is included in the network operators which allow download of the eSIM profile of the lock setting information.

Figure 6:
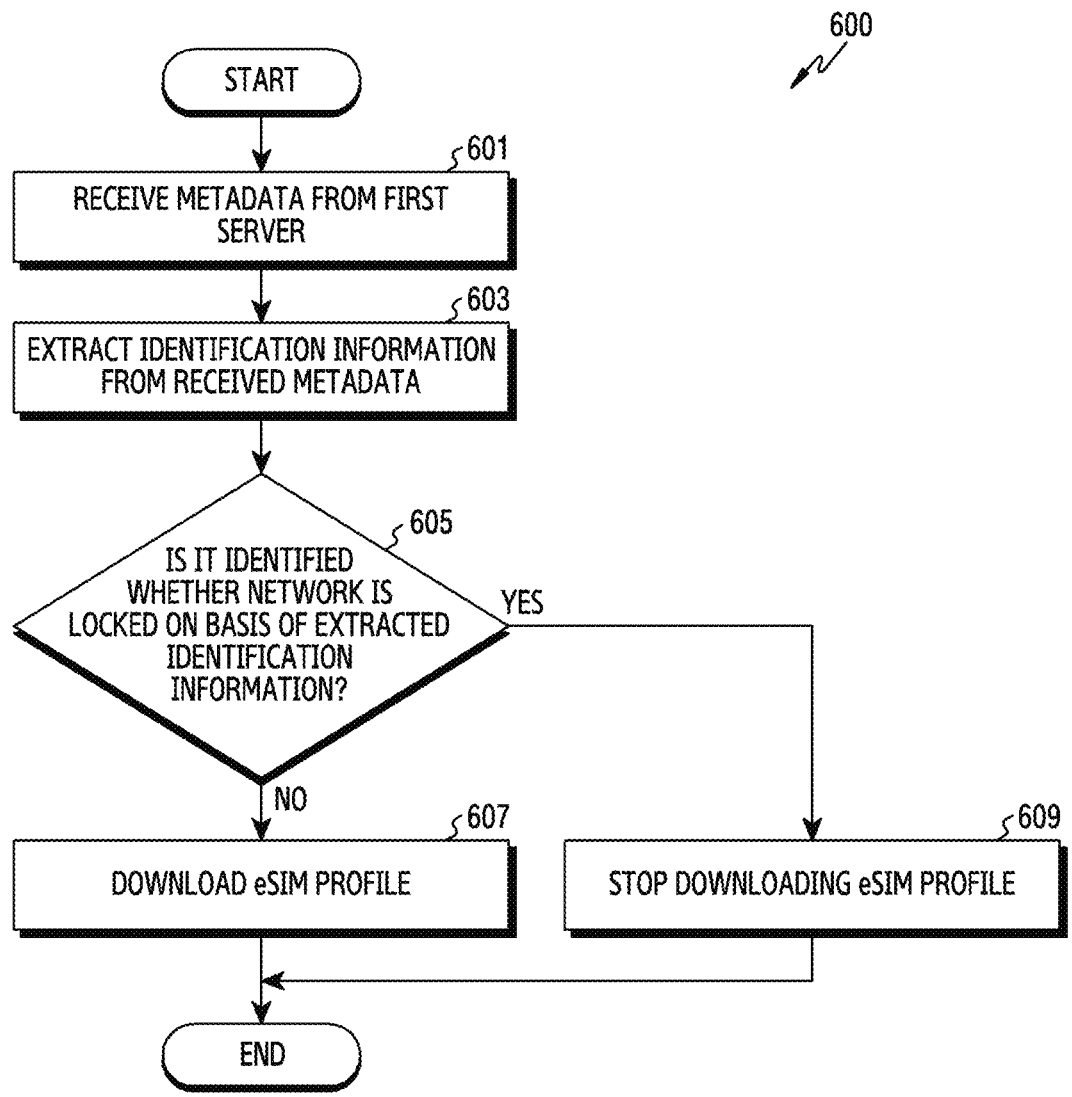
FIG. 6 illustrates a flowchart of an electronic device for installing a subscriber profile based on metadata of the subscriber profile received from a first server according to various embodiments.

FIG. 6 illustrates a flowchart 600 of an electronic device 101 for installing a subscriber profile based on metadata of the subscriber profile received from a first server according to various embodiments. The subject of operations in the flowchart 600 illustrated in FIG. 6 may be understood as the electronic device 101 or a component (e.g., the processor 410) of the electronic device 101.

Referring to FIG. 6, in operation 601, the electronic device 101 (e.g., the processor 410) may receive metadata about an eSIM profile from a first server 460 (e.g., the SM-DP 230 of FIG. 2). For example, before accessing the first server 460 and downloading the eSIM profile of the electronic device 101, the electronic device 101 may request the metadata about the eSIM profile from the first server 460. The first server 460 may transmit the metadata about the eSIM profile to the electronic device 101 in response to the request for the metadata about the eSIM profile from the electronic device 101. The metadata about the eSIM profile may include at least one of the ICCID of the eSIM profile, a profile name, an operator/service provider name, a user's profile nickname, an icon, a profile class, notification configuration information, and a profile owner. The profile class may include any one of test, operational, or provisioning. The profile owner may include at least one of an MCC, an MNC, GID1, and/or GID2.

In operation 603, the electronic device 101 may extract identification information from the received metadata about the eSIM profile. The identification information may be information for identifying a network operator and may include, for example, at least one of an MCC, an MNC, GID1, and/or GID2. The electronic device 101 may extract at least one of the MCC, the MNC, GID1, and/or GID2 included in the profile owner in the received metadata about the eSIM profile. According to one embodiment, the electronic device 101 may extract at least one of the MCC, the MNC, GID1, and/or GID2 from the ICCID included in the metadata about the eSIM profile.

In operation 605, the electronic device 101 may determine whether a network is locked based on the extracted identification information. For example, the electronic device 101 may compare the identification information with lock setting information previously stored in the electronic device 101, thereby checking whether network lock occurs in the electronic device 101. The lock setting information may include information about network operators which may lock a network or information about network operators which allows download of the eSIM profile. For example, the lock setting information may include at least one of an MCC, an MNC, GID1 and/or GID2.

When it is determined that network lock does not occur in the electronic device 101, the electronic device 101 may download the eSIM profile in operation 607. According to one embodiment, when the lock setting information includes information about network operators which may lock a network, the electronic device 101 may specify a network operator through the identification information, and may download the eSIM profile when the specified network operator is not included in the network operators which may lock a network of the lock setting information. According to one embodiment, when the lock setting information includes information about network operators which allow download of the eSIM, the electronic device 101 may specify a network operator through the identification information, and may download the eSIM profile when the specified network operator is included in the network operators which allow download of the eSIM profile of the lock setting information.

When it is determined that network lock occurs in the electronic device 101, the electronic device 101 may stop downloading the eSIM profile in operation 609. According to one embodiment, when the lock setting information includes information about network operators which may lock a network, the electronic device 101 may specify a network operator through the identification information, and may stop downloading the eSIM profile when the specified network operator is included in the network operators which may lock a network of the lock setting information. According to one embodiment, when the lock setting information includes information about network operators which allow download of the eSIM profile, the electronic device 101 may specify a network operator through the identification information, and may stop downloading the eSIM profile when the specified network operator is not included in the network operators which allow download of the eSIM profile of the lock setting information.

Figure 7A:
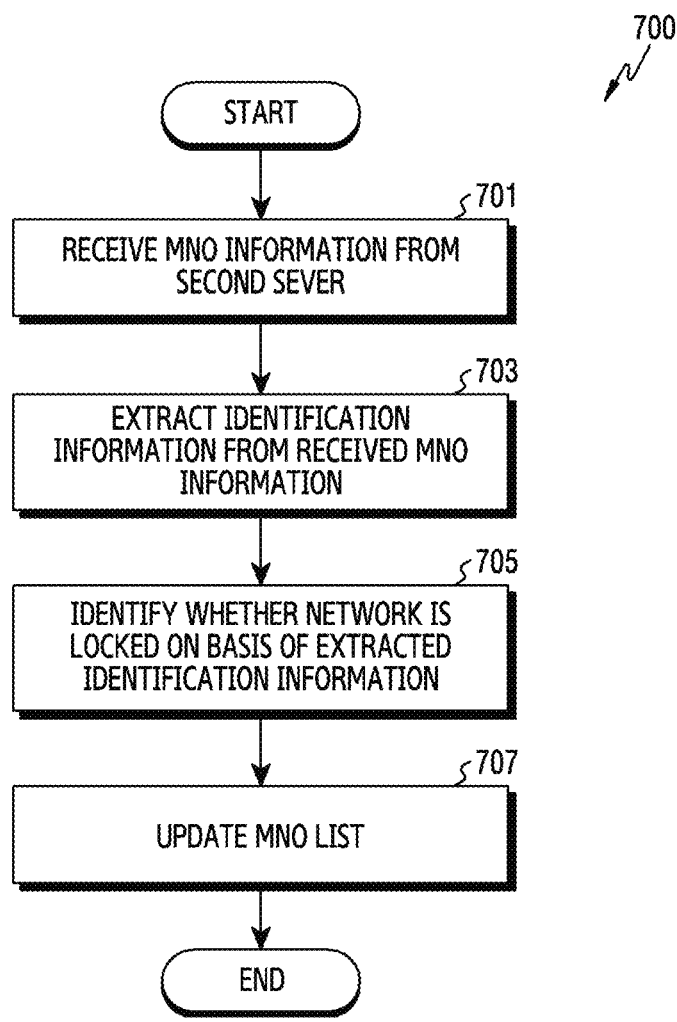
FIG. 7A illustrates a flowchart of an electronic device for updating an MNO list based on information about an MNO received from a second server according to various embodiments.
Figure 7B:
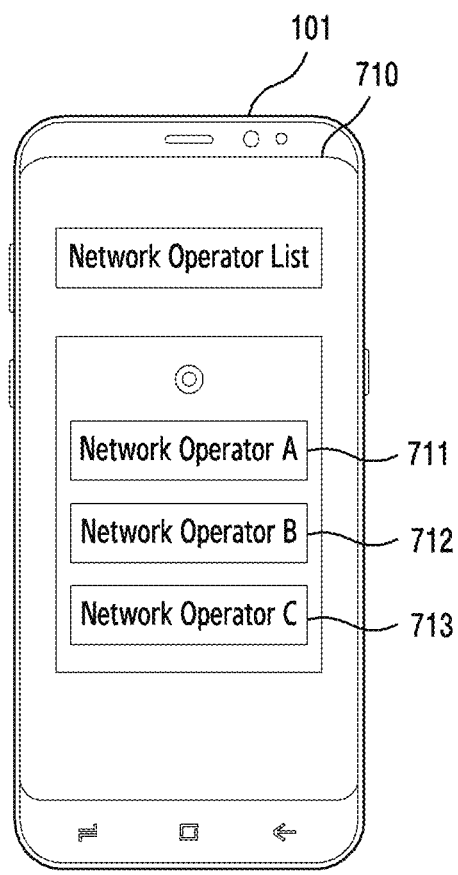
FIG. 7B illustrates a screen of an electronic device including an MNO list for the electronic device to install a subscriber profile according to various embodiments.

FIG. 7A illustrates a flowchart 700 of an electronic device 101 for updating an MNO list based on information about an MNO received from a second server according to various embodiments. FIG. 7B illustrates a screen of an electronic device 101 for installing a subscriber profile according to various embodiments. The subject of operations in the flowchart 700 illustrated in FIG. 7A may be understood as the electronic device 101 or a component (e.g., the processor 410) of the electronic device 101.

Referring to FIG. 7A, in operation 701, the electronic device 101 (e.g., the processor 410) may receive information about a mobile network operator (MNO) from the second server (e.g., 470 in FIG. 4). For example, before accessing a first server 460 (e.g., the SM-DP 230 of FIG. 2) and downloading an eSIM profile of the electronic device 101, the electronic device 101 may request the information about the MNO from the second server 470. The second server 470 may transmit the information about the MNO to the electronic device 101 in response to the request for the information about the MNO from the electronic device 101. The information about the MNO may include information about network operators. For example, the information about the MNO may include at least one of an ICCID, an MCC, an MNC, GID1, and/or GID2. According to various embodiments, before the eSIM profile is generated, the electronic device 101 may request the information about the MNO from the second server 470 and may receive the information about the MNO from the second server 470.

In operation 703, the electronic device 101 may extract identification information from the received information about the MNO. The identification information may be information for identifying a network operator and may include, for example, at least one of an MCC, an MNC, GID1, and/or GID2. According to one embodiment, when the information about the MNO includes the ICCID, the MCC, the MNC, GID1 and/or GID2 may be extracted from the ICCID.

In operation 705, the electronic device 101 may determine whether network lock occurs in the electronic device 101 based on the extracted identification information. For example, the electronic device 101 may compare the identification information with lock setting information previously stored in the electronic device 101, thereby checking whether network lock occurs in the electronic device 101. The lock setting information may include information about network operators which may lock a network or information about network operators which allow download of the eSIM profile. For example, the lock setting information may include at least one of an MCC, an MNC, GID1 and/or GID2. According to various embodiments, the electronic device 101 may determine whether network lock occurs in the electronic device 101 based on the received information about the MNO.

In operation 707, the electronic device 101 may update an MNO list. The MNO list may be a list of at least one network operator which locks a network or a list of at least one network operator which allows download of the eSIM profile. Referring to FIG. 7B, the electronic device 101 may display a screen 710 including the updated MNO list on a display 440. The updated MNO list may include a plurality of MNOs 711, 712, and 713. According to one embodiment, when the updated MNO list is a list allowing download of the eSIM profile, upon detecting an input for one of the plurality of MNOs 711, 712, and 713, the electronic device 101 may make a network subscription request to a server of the MNO. According to one embodiment, when the updated MNO list is a list allowing download of the eSIM profile, upon detecting an input for one of the plurality of MNOs 711, 712, and 713, the electronic device 101 may make a request to download a corresponding eSIM profile to the first server 460.

According to various embodiments, when the MNO list is a list of at least one network operator which locks a network and the lock setting information includes information about network operators which lock a network, the electronic device 101 may specify a network operator based on the identification information, and may add the specified network operator to the MNO list when the specified network operator is included in the lock setting information. The electronic device 101 may specify a network operator based on the identification information, and may remove the specified network operator from the MNO list when the specified network operator is not included in the lock setting information.

According to various embodiments, when the MNO list is a list of at least one network operator which locks a network and the lock setting information includes information about network operators which allow download of the eSIM profile, the electronic device 101 may specify a network operator based on the identification information, and may remove the specified network operator from the MNO list when the specified network operator is included in the lock setting information. The electronic device 101 may specify a network operator based on the identification information, and may add the specified network operator to the MNO list when the specified network operator is not included in the lock setting information.

According to various embodiments, when the MNO list is a list of at least one network operator which allows download of the eSIM profile and the lock setting information includes information about network operators which lock a network, the electronic device 101 may specify a network operator based on the identification information, and may remove the specified network operator from the MNO list when the specified network operator is included in the lock setting information. The electronic device 101 may specify a network operator based on the identification information, and may add the specified network operator to the MNO list when the specified network operator is not included in the lock setting information.

According to various embodiments, when the MNO list is a list of at least one network operator which allows download of the eSIM profile and the lock setting information includes information about network operators which allow download of the eSIM profile, the electronic device 101 may specify a network operator based on the identification information, and may add the specified network operator to the MNO list when the specified network operator is included in the lock setting information. The electronic device 101 may specify a network operator based on the identification information, and may remove the specified network operator from the MNO list when the specified network operator is not included in the lock setting information.

Figure 8A:
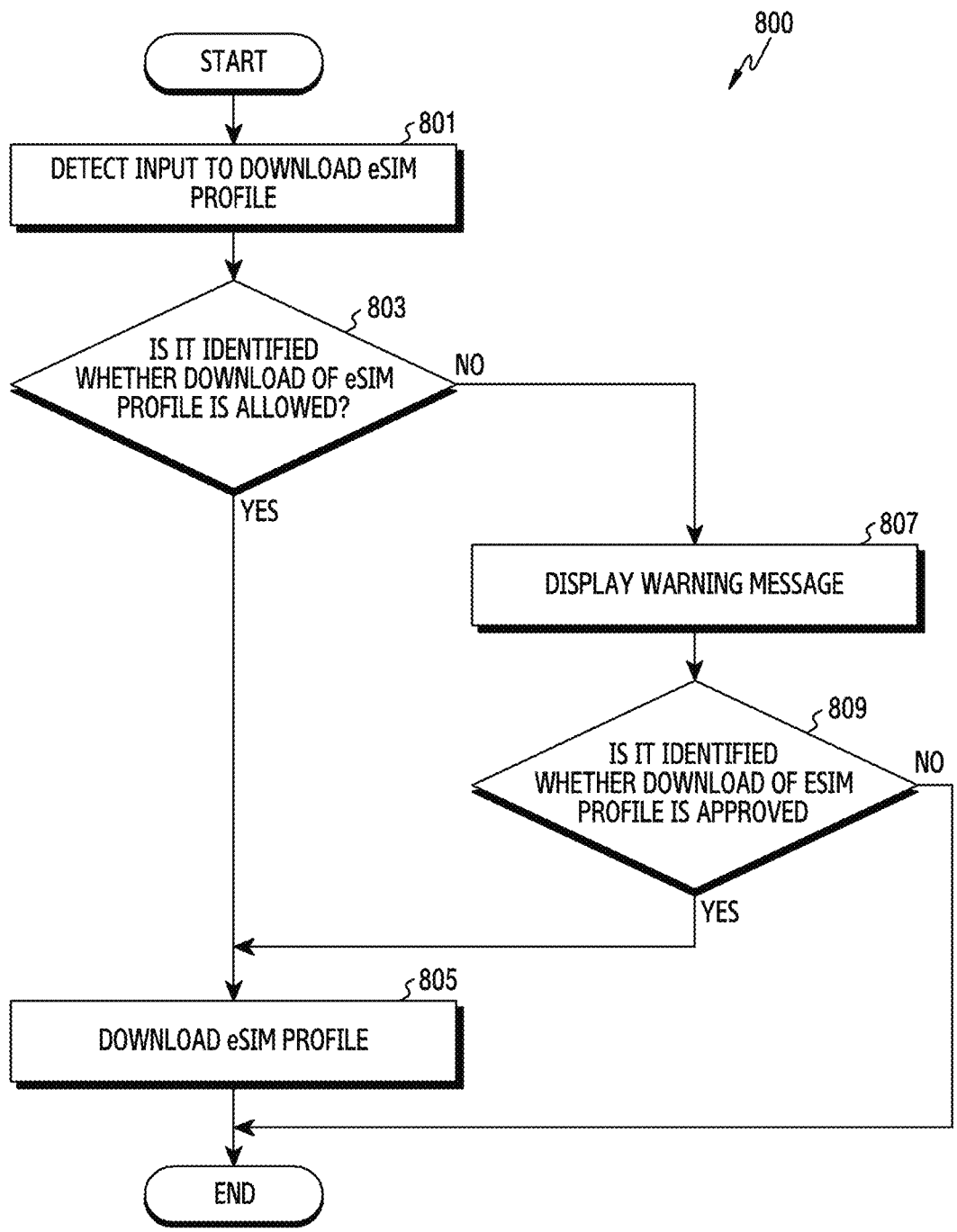
FIG. 8A illustrates a flowchart of an electronic device for displaying a warning about installing a subscriber profile according to various embodiments.
Figure 8B:
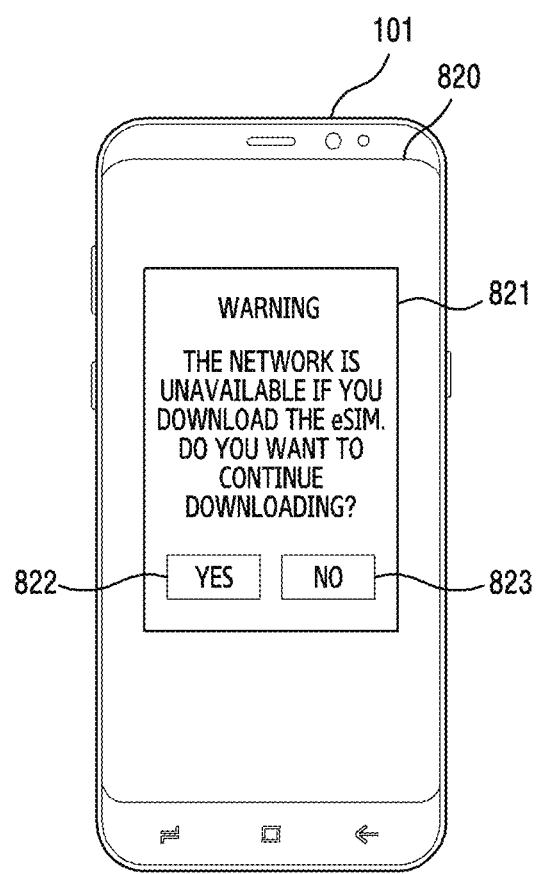
FIG. 8B illustrates a screen of an electronic device including a warning message before the electronic device installs a subscriber profile according to various embodiments.

FIG. 8A illustrates a flowchart 800 of an electronic device 101 for displaying a warning about installing a subscriber profile according to various embodiments. FIG. 8B illustrates a screen of an electronic device 101 for installing a subscriber profile according to various embodiments. The subject of operations in the flowchart 800 illustrated in FIG. 8A may be understood as the electronic device 101 or a component (e.g., the processor 410) of the electronic device 101. FIG. 8A shows an example of an interface operation of the electronic device 101 for installing a subscriber profile.

Referring to FIG. 8A, in operation 801, the electronic device 101 (e.g., the processor 410) may detect an input to download an eSIM profile. For example, when a user inputs download of an eSIM profile to the electronic device 101, the electronic device 101 may detect the input to download the eSIM profile. When detecting the input to download the eSIM profile, the electronic device 101 may make a request to download the eSIM profile to a first server 460. According to various embodiments, when a subscription to a network operator is made, the electronic device 101 may receive an input to download an eSIM profile from a server of the network operator.

In operation 803, the electronic device 101 may identify whether download of the eSIM profile is allowed. According to one embodiment, upon making the request to download the eSIM profile to the first server 460, the electronic device 101 may receive metadata about the eSIM profile from the first server 460 and may identify whether download of the eSIM profile is allowed based on the received metadata.

When it is identified that download of the eSIM profile is allowed, the electronic device 101 may download the eSIM profile in operation 805.

When it is identified that download of the eSIM profile is not allowed, the electronic device 101 may display a warning message on a display 440 in operation 807. For example, referring to FIG. 8B, upon identifying that download of the eSIM profile is not allowed, the electronic device 101 may display a screen 820 including a warning message 821 on the display 440. The warning message 821 may be a text message, for example, "The network is unavailable if you download the eSIM. Do you want to continue downloading?".

In operation 809, the electronic device 101 may identify whether download of the eSIM profile is approved. Referring to FIG. 8B, when the electronic device 101 detects an input to approve 822 download of the eSIM by the user, the electronic device 101 may proceed to operation 805 and may download the eSIM profile. When the electronic device 101 detects an input to disapprove 823 download of the eSIM profile by the user, the electronic device 101 may terminate the procedure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An operating method of an electronic device, the method comprising:
    requesting to download an eSIM profile of the electronic device from a first server;
    receiving network operator-related information corresponding to the eSIM profile from the first server;
    prior to downloading the eSIM profile, determining whether network lock occurs in the electronic device by comparing the received network operator-related information with lock setting information stored in a memory of the electronic device;
    identifying whether download of the eSIM profile is allowed based on the determination of whether a network lock occurs; and
    downloading the eSIM profile when download of the eSIM profile is allowed.

2. The method of claim 1, wherein receiving the network operator-related information comprises:
    requesting the network operator-related information corresponding to the eSIM profile of the electronic device from a second server; and
    receiving the network operator-related information from the second server.

3. The method of claim 1, wherein the network operator-related information comprises at least one of metadata of the eSIM profile, a mobile country code (MCC), a mobile network code (MNC), a group identifier (GID), or an integrated circuit card identifier (ICCID).

4. The method of claim 1, wherein the identifying whether download of the eSIM profile is allowed comprises:
    extracting identification information for identifying a specific operator from the network operator-related information; and
    identifying whether download of the eSIM profile is allowed based on the identification information.

5. The method of claim 4, wherein the identifying whether download of the eSIM profile is allowed based on the identification information comprises identifying whether download of the eSIM profile is allowed based on whether the identification information is comprised in lock setting information in the electronic device, and
    the lock setting information comprises information about at least one network operator that causes network lock in the electronic device.

6. The method of claim 1, further comprising:
    stopping the eSIM profile from downloading when download of the eSIM profile is not allowed.

7. The method of claim 1, further comprising:
    displaying a warning message on the electronic device when download of the eSIM profile is not allowed.

8. The method of claim 1, further comprising:
    adding a network operator that allows download of the eSIM profile to an MNO list stored in advance in the electronic device when download of the eSIM profile is allowed.

9. The method of claim 1, further comprising:
    removing a network operator that does not allow download of the eSIM profile from an MNO list stored in advance in the electronic device when download of the eSIM profile is not allowed.

10. An electronic device comprising:
    a memory;
    a display;
    a communication unit; and
    a processor configured to be operatively connected with the memory, the display, and the communication unit,
    wherein the processor is configured to:
        request to download an eSIM profile of the electronic device from a first server;
        receive network operator-related information corresponding to the eSIM profile from the first server;
        prior to downloading the eSIM profile, determine whether network lock occurs in the electronic device by comparing the received network operator-related information with lock setting information stored in a memory
        identify whether download of the eSIM profile is allowed based on the determination of whether a network lock occurs; and
        download the eSIM profile when download of the eSIM profile is allowed.

11. The electronic device of claim 10, wherein the processor is configured to:
    request the network operator-related information corresponding to the eSIM profile of the electronic device from a second server; and
    receive the network operator-related information from the second server.

12. The electronic device of claim 10, wherein the network operator-related information comprises at least one of metadata of the eSIM profile, a mobile country code (MCC), a mobile network code (MNC), a group identifier (GID), or an integrated circuit card identifier (ICCID).

13. The electronic device of claim 10, wherein the processor is configured to extract identification information for identifying a specific operator from the network operator-related information.

14. The electronic device of claim 13, wherein the processor is configured to identify whether download of the eSIM profile is allowed based on whether the identification information is comprised in lock setting information in the electronic device, and the lock setting information comprises information about at least one network operator that causes network lock in the electronic device.

15. The electronic device of claim 10, wherein the processor is configured to stop the eSIM profile from downloading when download of the eSIM profile is not allowed.

16. The electronic device of claim 10, wherein the processor is configured to display a warning message on the electronic device when download of the eSIM profile is not allowed.

17. The electronic device of claim 10, wherein the processor is configured to add a network operator that allows download of the eSIM profile to an MNO list stored in advance in the electronic device when download of the eSIM profile is allowed.

18. The electronic device of claim 10, wherein the processor is configured to remove a network operator that does not allow download of the eSIM profile from an MNO list stored in advance in the electronic device when download of the eSIM profile is not allowed.

* * * * *